Dec. 23, 1924.
W. C. WRIGHT
QUICK RELEASE APPARATUS FOR AIR BRAKE CYLINDERS
Filed July 2, 1924
1,520,166
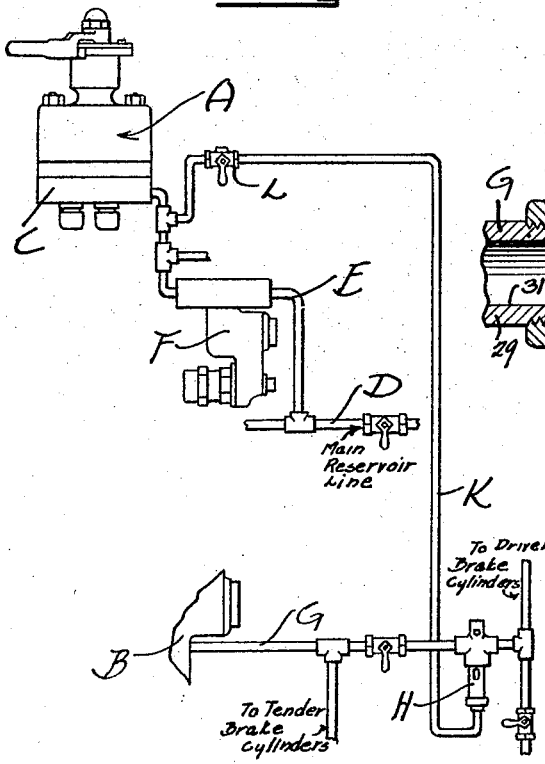
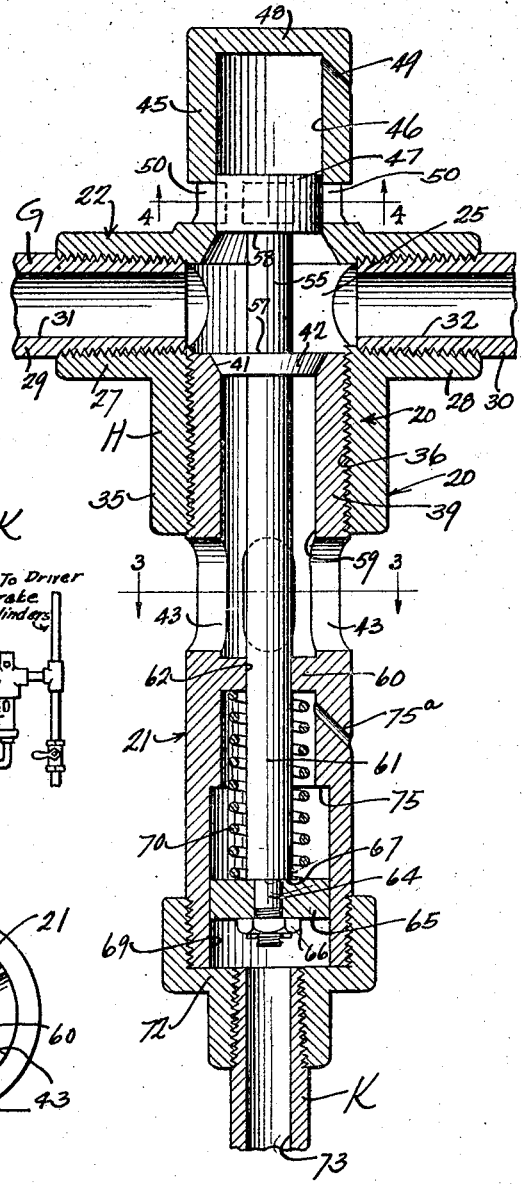
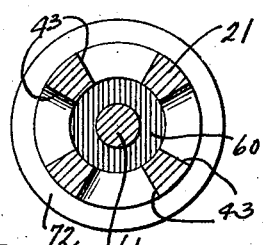
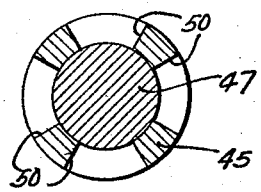
Inventor
Walter C. Wright
By Lamaster and Allwine
Attorneys Patented Dec. 23, 1924.

1,520,166

UNITED STATES PATENT OFFICE.

WALTER C. WRIGHT, OF YOUNGSTOWN, OHIO.

QUICK-RELEASE APPARATUS FOR AIR-BRAKE CYLINDERS.

Application filed July 2, 1924. Serial No. 723,800.

*To all whom it may concern:*

Be it known that I, WALTER C. WRIGHT, a citizen of the United States, residing at Youngstown, in the county of Mahoning and State of Ohio, have invented certain new and useful Improvements in a Quick-Release Apparatus for Air-Brake Cylinders, of which the following is a specification.

This invention relates to improvements in brake equipment, and more particularly relates to novel quick release mechanism which will permit of practically instantaneous release of air pressure from a brake cylinder.

The primary object of this invention is the provision of novel quick release mechanism for air brake equipment of conventional character, in which a quick release valve is associated in any approved manner with the air brake cylinder or the line leading thereto, and which is operated by air pressure controlled from a three way cock so that air pressure may be withdrawn from any approved place in the conventional brake equipment in order to unseat the quick release valve, and so that the reduction of air pressure in the air brake cylinder and line leading thereto may be effected for release of a brake application.

A further object of this invention is the provision of a quick release valve including novel details of construction which renders the same of a practical nature for use in connection with air brake systems as herein set forth. This valve is of a different construction than the quick release valve set forth in my co-pending application Serial Number 701,525, filed March 24, 1924, in that the herein described valve is unseated only by air pressure to permit of release of brake cylinder pressure.

A further object of this invention is the provision of a novel specific valve structure for quick release of air from air brake cylinders, in which the parts are so arranged that any application of air pressure to the parts thereof will not have any detrimental effect on the parts thereof, so that all movable valve parts will move to a proper position without jar or shock.

Other objects and advantages of this invention will be apparent during the course of the following detailed description.

In the accompanying drawing, forming a part of this specification, and wherein similar reference characters designate corresponding parts throughout the several views, Figure 1 is a fragmentary diagrammatic view showing a conventional air brake system and the manner in which the improved quick release valve mechanism may be associated with certain parts thereof.

Fig. 2 is a longitudinal cross sectional view taken through the improved quick release valve mechanism, showing associated conduit connections therewith.

Figs. 3 and 4 are cross sectional views taken on their respective lines in Figure 2 of the drawing.

In the drawing, wherein for the purpose of illustration is shown only the preferred embodiment of this invention, the letter A may generally designate any approved type of air brake system, which may include ordinary conventional features of an air brake system, such as a main reservoir (not shown); distributing valve B; automatic brake valve (not shown); independent brake valve C; brake cylinders (not shown); main reservoir line D; line E leading from the main reservoir line D to the independent brake valve C, and in which line E a reducing valve F is provided, as is the conventional arrangement. A pipe or conduit G leads from the distributing valve to the driver brake cylinders and truck cylinders in any approved manner. The improved quick release valve structure H may be connected to the brake cylinders directly, or from a branch line leading from the brake pipe G, or in any other approved location, but the preferred location of the same is in the brake line G leading from the distributing valve B to the driver brake cylinders. The pipe K for the feeding of air pressure for unseating the valve of the structure H is preferably connected to the improved quick release valve structure H at one end, and at its other end is connected in the line E between the reducing valve F and the independent brake valve C; said line K preferably having a three way cock L located therein for a purpose to be subsequently mentioned.

Referring to the improved structure of the quick release valve H, the same includes a housing 20 which may be of tubular cast formation, including the cylindrical shaped body portion 21 and the coupling portion 22. The coupling portion 22 of the housing 20 preferably provides an internal compartment 25 therein, and has internally screw threaded oppositely disposed extensions 27 and 28, adapted to detachably receive the sections 29 and 30 of the brake pipe G leading from the distributing valve B to the driver brake cylinders (not shown), so that the passageways 31 and 32 of these brake pipe sections 29 and 30 respectively are in communication with each other through the compartment 25. The housing section 22 furthermore includes a relatively large tubular extension 35 provided with an internally screw threaded passageway 36, the axis of which is arranged at right angles to the axes of the extensions 27 and 28, and which internally screw threaded passageway 36 is adapted to receive the upper externally screw threaded end 39 of the housing body portion 21, so that the latter extends outwardly from the coupling section 22, in the relation shown in the drawing.

When the sections 21 and 22 of the housing 20 are assembled, the section 21 in facing relation to the compartment 25, and at one side of the communicating passageways of the extensions 27 and 28 and the brake pipe connections therewith, provides a beveled valve seat 41 which is disposed in a converging relation toward the axis of the housing section 21, away from the compartment 25. Upon this seat 41 a frusto conical shaped valve 42 is adapted to be seated, to close communication of the brake cylinder and brake pipe with respect to the release ports 43, which are provided in the housing body portion 21, of relatively large size, at the opposite side of the valve seat 41 with respect to the communicating passageways 31 and 32 of the pipe sections.

A cylindrical shaped extension 45 is integrally connected with the coupling section 22 of the housing 20, upon the opposite side of the compartment 25 with respect to the extension 35, and which provides a reduced bore or compartment 46 therein within which a piston 47 slidably operates. The extension 45 includes a top wall 48 to close the compartment 46, and above the piston 47 the compartment 46 is preferably provided with a relatively small diagonally disposed port 49, which outlets to the atmosphere. The extension 45 is preferably provided with an annular series of radially extending ports or openings 50 in the same, just upwardly of the lateral extensions 27 and 28, and of course, above the compartment 25, which are uncovered when the piston 47 slides upwardly in the compartment 46, as will be subsequently described. The piston 47 and the valve 42 are connected in a fixed spaced relation by means of a rod 55, so that they are normally disposed at opposite sides of the communicating passageways provided in the extensions 27 and 28. Air pressure which enters the housing compartment 25 by way of the brake line G acts upon the facing surfaces of the valve and piston 42 and 47 respectively. It is to be noted that the surface 57 of the valve 42 which faces the surface 58 of the piston 47, is greater in area than the surface 58, so that the action of the air pressure is normally to seat the valve 42, as atmospheric pressure exists at the outer sides of both the valve 42 and piston 47.

Referring now more specifically to the body portion 21, the same is of hollow cylindrical formation, and the atmospherically communicating ports 43 connect with the passageway 59 in said body 21, above an annular bearing flange 60 which is provided on the opposite side of the opening 43 from the valve 42. A rod 61 slidably extends through the reduced opening 62 provided through the bearing flange 60, and this rod at its one end is connected with the valve 42, and in fact the rod 61 may be a part of the rod 55 above mentioned. At its end opposite the valve 42 the rod 61 is provided with a reduced screw threaded shank 64, which is adapted to receive a piston 65, secured on said shank 64 by means of a nut 66 which clamps it against the shoulder 67 provided at the juncture of the body of the rod 61 and the reduced shank 64. This piston 65 is slidably disposed in the passageway or compartment 69 provided in the end of the body 21 opposite from the valve seat 41, and a spiral compression spring 70 is disposed between the bearing flange 60 and the piston 65, normally acting upon the latter to force the valve 42 upon its beveled seat 41.

The housing section 21 at its end opposite the connecting section 22 is preferably externally screw threaded for receiving a coupling cap 72, by means of which the improved release valve H may be connected in the operating line K, so that the passageway 73 of said operating line K is in direct communication with the compartment 69 below the piston 65.

In order to limit the inward amplitude of movement of the piston 65, the housing body 21 is provided with an annular shoulder 75 therein, just inwardly of the valve 65, against which the latter may engage if air pressure in the line K is sufficient to forcefully impel the piston 65 along the compartment 69 in which it slides. In order to permit exhaustion of air from the space between the piston 65 and the bearing flange 60 thru which the rod 61 has a snug sliding fit, a downwardly inclined port 75ª, which is relatively minute is provided, in order that atmospheric pressure may exists in this space inwardly of the piston 65.

Referring to the operation of the improved quick release valve and its association with the air brake system, the three way cock L in the line K is placed so that the line K between the three way cock of valve A and the quick release valve H is normally atmospherically communicated, through an opening (not shown) provided in the three way cock L, so that atmospheric pressure normally acts against the piston 65 at both sides, except when it is desired to have a quick release of a brake application. If no impelling force tends to unseat the valve 42, the spring 70 will of course maintain the valve 42 seated, and when air pressure exists within the brake cylinders or the line G the valve 42 is all the more tightly seated, because of the greater area exposed on the valve 42 than on the piston 47. It is only necessary to have reduced air pressure from the line E in order to operate the quick release valve, and hence the line K is connected between the reducing valve F and the independent brake valve C, so that the three way cock L may be thrown to communicate the pipe K with the conduit E for conduction of air pressure into the compartment or passageway 69 of the housing 20, and the reduced air pressure acting against the piston 65 will force the piston upwardly along the passageway 69, and of course, movement of the rod 61 ensues and unseats the valve 42. When the valve 42 is unseated, pressure in the air brake line G will immediately vent through the passageway 59 of the housing and out of the atmospherically communicating ports 43, reducing the air pressure in the line G for releasing the brake application.

To prevent injury to the valve parts, a buffing action takes place between the piston 65 and the stationary bearing flange 60, because of the fact that the air in this compartment between these elements may only vent through the very small port 75ª, which is diagonally positioned in the side wall of the housing. The spring 70 also provides a buffing action, and normally tends to retard the unseating action of the valve mechanism when the reduced air pressure from the line K is suddenly thrown on. Notwithstanding these features the annular shoulder 75 also prevents a too far movement of the piston 65 in the passageway 69, and prevents possible injury to the movable valve details. Of course, the buffing actions of the compressing air in the space between the piston 65 and the annular bearing flange 60 and the buffing action afforded by the spring 70 comes into play prior to any contact of the piston 65 against the annular shoulder 75, so that injury to parts is prevented.

A buffing action is also afforded in the bore or compartment 46, above the piston 47, since the air space therein only has an outlet through the duct 49. An improved feature of the quick release valve structure is the provision of the ports 50 which are unseated by the piston 47 as the piston 47 moves upwardly into the compartment 46, and air pressure from the brake line G vents through these radial openings 50, to quickly release the same and prevent any continued excessive pressure action against the piston 47 which would tend to act abruptly upon the movable valve parts. The piston 47 is thick enough to cover the ports 50 when the valve 42 is seated, and thus protecting the interior passageways and compartments of the valve structure H from the entrance of any foreign matter. The minute ports 49 and 75ª also slope downwardly from the inside of the housing 21 to the outside thereof, to prevent entrance of foreign matter or drain of water thereinto.

While I have shown the improved valve H connected in the sections 29 and 30 of the conventional brake pipe G, it can also be connected at other points, for instance, directly in the cylinder head of the brake cylinder, or by means of a T upon the brake pipe.

From the foregoing description of this invention it is apparent that a novel type of quick release mechanism for air brake systems has been provided, which includes a novel specific valve structure, that will release the brake promptly, yet increase the practical working details by which a violent movement of valve parts is prevented.

Various changes in the shape, size, and arrangement of parts may be made to the form of the invention herein shown and described, without departing from the spirit of this invention or the scope of the claims.

I claim:

1. In an air brake release valve of the class described the combination of a casing embodying a compartment therein and a transverse passageway, a valve supported upon a seat in the compartment to one side of said passageway, and a piston supported in the casing to the opposite side of said passageway, means connecting the piston and the valve for movement together, said valve and piston at opposite sides with respect to said passageway having atmospheric communication, and said valve having a greater effective area facing the passageway than said piston.

2. In a quick release valve for brake systems the combination of a substantially cylindrical casing providing a compartment therein and a laterally communicating passageway, a tapered seat in said compartment extending in a converging relation to one side of and away from said passageway, a valve for said seat, a piston in the casing to the opposite side of said passageway, a rod connecting the valve and piston, and means tending to maintain the valve seated.

3. In a valve of the class described the combination of a casing providing a compartment therein and a lateral passageway communicating with the compartment, a valve seated in the compartment to one side of said passageway and movable only in the direction of the passageway from its seat, a piston rigidly connected with the valve in spaced relation therewith, and means carried by the casing providing a compartment within which the piston slides on the opposite side of the passageway with respect to said valve, said means on the opposite side of the piston with respect to said valve having a relatively small atmospherically communicating port, and said casing on the opposite side of the valve with respect to said passageway having atmospherically communicating openings therein.

4. In a valve of the class described the combination of a casing providing a compartment therein and a lateral passageway communicating with the compartment, a valve seated in the compartment to one side of said passageway and movable only in the direction of the passageway from its seat, a piston rigidly connected with the valve in spaced relation therewith, means carried by the casing providing a compartment within which the piston slides on the opposite side of the passageway with respect to said valve, said means on the opposite side of the piston with respect to said valve having a relatively small atmospherically communicating port, and said casing on the opposite side of the valve with respect to said passageway having a number of atmospherically communicating openings therein, a second piston fixedly connected with said valve and disposed on the opposite side of said valve with respect to said first mentioned piston, and means carried by said casing for connecting a conduit thereto on the opposite side of the second mentioned piston with respect to said valve.

5. In a valve of the class described the combination of a casing, means providing a passageway communicating with said casing, a tapered valve seat in the casing to one side thereof and arranged in a converging relation away from said passageway, a valve for said seat, an extension outwardly supported on the casing providing a compartment therein of less diameter than the compartment of said casing, a piston slidable in said compartment of said extension, said extension at the end thereof having a relatively small port communicating its compartment with the atmosphere, a rod connecting said piston with said valve, said casing at the opposite side of said valve with respect to said passageway providing atmospheric communicating openings therein, a bearing supported in the casing at the opposite side of said last mentioned openings with respect to said valve, a rod slidably mounted in said bearing fixedly connected with said valve, a second piston carried at the end of said rod, a spring under compression between said second piston and said bearing, and means carried by said casing adapted for connection of a conduit thereto, said means being arranged on the casing at the opposite side of the second piston with respect to said valve.

6. In an air brake system the combination of a distributing valve, conduit means connecting the distributing valve with the brake cylinders of the air brake system, a quick release valve in said conduit means having atmospheric communication, conduit means connecting with an air supply conduit of said air brake system, and valve means in said last mentioned conduit means for feeding of air pressure to said quick release valve means for unseating the same to permit exhausts of air pressure from the conduit means first mentioned.

7. In an air brake system the combination with a distributing valve, a driver brake cylinder pipe leading from the distributing valve, and a conduit within which reduced air pressure is maintained, a quick release valve located on the brake pipe including a valve normally seated to permit flow of air pressure through said brake pipe, conduit means connecting the quick release valve with said reduced air pressure line, and valve means in said last mentioned conduit means adapted to be controlled for flow of reduced air pressure to the quick release valve means whereby to unseat the valve thereof and permit escape of air pressure from the brake pipe to the atmosphere.

8. In an air brake system of conventional character including driver brake cylinders and a reduced air pressure line, a quick release valve, means connecting the quick release valve with the driver brake cylinders, means normally maintaining the quick release valve closed to hold air pressure in the driver brake cylinders, and conduit means connected with the reduced air pressure line including a valve adapted to permit flow of reduced air pressure to the valve of said quick release valve means whereby to unseat the same and permit escape of air pressure from the brake cylinders to the atmosphere.

9. In a valve of the class described a housing providing a compartment therein with a lateral passageway communicating with the compartment, a valve seated in the compartment at one side of the passageway and movable only in the direction of the passageway from its seat, a piston rigidly connected with the valve in spaced relation therewith, and means carried by the casing providing a compartment within which the piston slides on the opposite side of the passageway with respect to said valve, said means including exhaust ports normally covered by the piston means when the valve is closed and adapted to be uncovered to provide atmospheric communication of the compartment with the atmosphere when the valve is unseated, said casing on the opposite side of the valve with respect to said passageway having atmospheric communication.

10. In a valve of the class described a housing providing a compartment therein with extensions on each side thereof providing passageways therethrough, an extension above the compartment providing ports therein, an extension below the compartment having a valve seat therein, a valve for the valve seat movable only in the direction of the compartment, a piston fixedly connected with the valve on the opposite side of the compartment from said valve, and said piston operating within said upper extension so that the ports therein are normally closed when the valve is seated and which will open to the compartment when the valve is unseated.

11. In a valve for quick release of air from brake cylinders the combination of a housing providing a compartment therein having a passageway leading into the compartment and a valve seat at one side of the passageway and compartment, a valve for the valve seat operable only in the direction of the compartment, said casing at the opposite side of the valve from said compartment having atmospheric communication, a piston connected with the valve operating in said casing at the opposite side of the compartment from the valve, said casing having openings which are closed by the piston only when the valve is seated and which will be open to the atmosphere when the valve is unseated.

12. In a quick release valve mechanism of the class described a housing including a compartment therein with a laterally communicating passageway and a valve seat at one side of the compartment, a valve for said valve seat, piston means connected with the valve and operating in the housing at the opposite side of the compartment from said valve, said housing having ports therein at the opposite side of the valve from said compartment, a piston connected with said valve at the opposite side of the valve from the first mentioned piston and operating in said housing at the opposite side of said housing ports from said valve, and spring means acting on said last mentioned piston to maintain the valve closed.

13. In a quick release valve structure of the class described a housing including a cylindrical shaped body portion, a coupling portion providing a compartment therein with lateral extensions providing passageways therethrough, a lower extension into which the cylindrical shaped body portion is connected and an upper extension having exhaust ports therein, said body portion of the housing at one side of the compartment of the coupling portion providing a tapered valve seat tapering in converging relation away from said compartment, a valve for said valve seat, a piston connected for movement with said valve, said piston being operably disposed in the upper extension of said coupling portion of the housing and when the valve is closed being positioned to normally close the exhaust openings through said upper extension, said upper extension above said piston providing a compartment having a minute exhaust duct therein, said housing body portion below said lower extension providing relatively large exhaust ports therein which are adapted to communicate the compartment with the atmosphere when the valve is unseated, a valve rod connected with said valve and extending downwardly through said valve body portion, an annular flange providing a bearing for said valve rod at the opposite side of the exhaust ports of the body portion from said valve, said body portion at the opposite side of the bearing flange from said valve providing a passageway therein with an annular shoulder, a piston carried by the end of the rod which is operable in said last mentioned passageway, spring means normally under compression between said piston and said annular bearing flange normally tending to seat the valve, and means on the outer end of said body portion of the housing for connecting a conduit thereto.

14. In combination with an air brake system including a brake line, a housing including a compartment, means for connecting the brake line with the housing to communicate said brake line with said compartment, a valve at one side of said compartment normally seated by pressure from the brake line, a piston at the opposite side of the compartment from said valve, said piston being of smaller exposed surface in said compartment than the valve whereby air pressure from the brake line will overbalance the piston and maintain the valve seated, said housing including atmospherically communicating ports normally closed by said piston when the valve is seated, said housing above said piston providing a space having a small exhaust port atmospherically communicating therewith, piston means operating in said housing at the opposite side of the valve from said first mentioned piston, spring means acting on the second mentioned piston means to maintain the valve seated, said housing above said second mentioned piston means providing a compartment having atmospheric communication thru a small port, means for limiting the amplitude of movement of the second piston means, and means for feeding reduced air pressure onto the second mentioned piston means whereby to unseat the valve for release of air pressure from the brake line to the atmosphere.

WALTER C. WRIGHT.